May 24, 1960 N. L. KREUDER 2,938,168

EXTENDED DELAY CIRCUIT

Filed June 10, 1957

INVENTOR.
NORMAN L. KREUDER

BY Christie, Parker & Hale

ATTORNEYS

United States Patent Office 2,938,168

Patented May 24, 1960

2,938,168

EXTENDED DELAY CIRCUIT

Norman L. Kreuder, Tujunga, Calif., assignor to Burroughs Corporation, Detroit, Mich., a corporation of Michigan Filed June 10, 1957, Ser. No. 664,528

5 Claims. (Cl. 328—55)

This invention relates generally to electric timing circuits and more particularly, is concerned with apparatus for generating a pulse a predetermined time after the last of a train of input pulses.

Monostable multivibrator circuits are well known in the art, and are characterized by having two conductive conditions one of which is unstable. When an input pulse is applied to a monostable multivibrator, it is triggered to its unstable state for a period of time determined by the resistance-capacitance values of the circuit, and then automatically returns to its initial stable state. Thus the monostable multivibrator is particularly suited for generating a predetermined time delay interval after an input pulse.

Resettable monostable multivibrator type circuits have heretofore been proposed which may effectively be maintained in the unstable state by a succession of input pulses, each input pulse recharging the resistive-capacitive network so that the circuit returns to its stable state after the same predetermined time following the last of the series of input pulses. The purpose of such a circuit, of course, is to provide a delayed output pulse only after the last of a series of input pulses, the delay being the same regardless of how many input pulses preceded the last of the series. Known modified multivibrator circuits for accomplishing this function have either been excessively complicated and expensive or have not generated accurately reproducible delay times.

The present invention provides a circuit which duplicates the function of a resettable monostable multivibrator of the type above described. The present circuit is characterized by its accuracy of delayed time whether the delay follows a single pulse or a series of resetting pulses.

In brief, the invention involves a bistable multivibrator which is triggered to its opposite stable state by the initial input pulse. Triggering of the bistable multivibrator by the initial pulse actuates a switch which in turn starts the charging of a capacitance. After a predetermined period of time determined by the time constant of the charging circuit, the capacitance reaches a charge voltage level sufficient to trigger a blocking oscillator. The output of the blocking oscillator returns the bistable multivibrator to its initial conductive condition. If it is desired to further delay the return of the bistable multivibrator to its initial state, until the end of a train of pulses, such train of pulses are applied to a monostable multivibrator, which multivibrator also actuates the switch to discharge the storage circuit. Thus each time a pulse is applied to the monostable vibrator the storage circuit is returned to its initial charge condition and the predetermined delay period is required to recharge it to a point where the blocking oscillator is triggered.

For a more complete understanding of the invention reference should be had to the accompanying drawing wherein.

Figure 1:
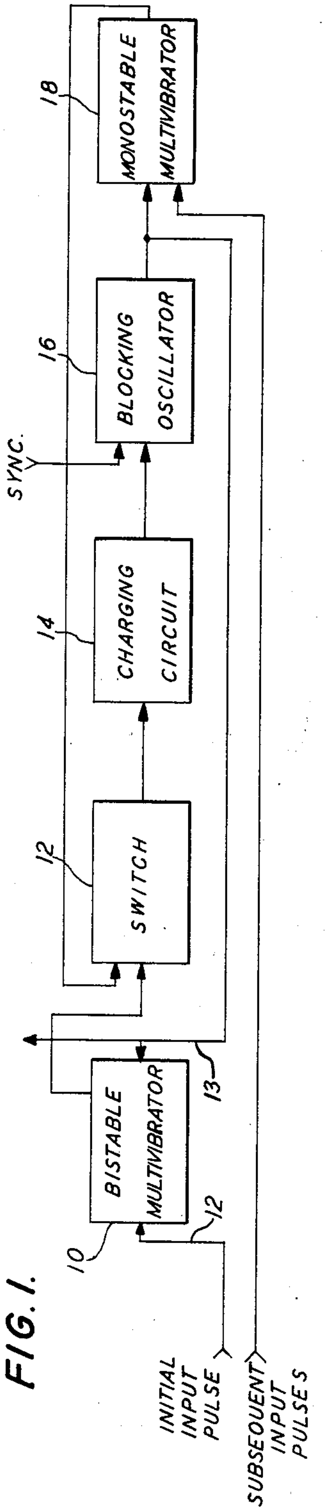
Fig. 1 is a block diagram of the extended delay circuit.

Referring to Fig. 1, the numeral 10 indicates generally a bistable multivibrator which may be triggered to one stable state or the other of its two stable states by pulses applied to the input leads 12 and 13 respectively. The multivibrator 10 is actuated by an initial input pulse on the input lead 12. The resulting change in the output level of the multivibrator 10 biases open a switch 12 permitting a storage capacitor in a charging circuit 14 to begin to charge up.

When the output of the charging circuit 14 reaches a predetermined level it actuates preferably a blocking oscillator 16, the output of which is connected to the input lead 13 of the bistable multivibrator 10. While a blocking oscillator is shown, other threshold devices which are triggered by an input potential which rises above a threshold level may be used, such as a Schmidt trigger circuit. Thus the multivibrator 10 is returned to its initial condition. The output of the blocking oscillator 16 is also applied to a monostable multivibrator circuit 18, the output of which is applied to the switch 12 to bias the switch 12 closed for a sufficient period of time to discharge the charging circuit 14.

In order to delay the return of the multivibrator 10 to its initial conductive state, successive input pulses may be applied to the monostable multivibrator 18. Each subsequent input pulse applied to the monostable multivibrator 18 actuates the switch 12 and discharges the charging circuit 14. This causes the charging circuit 14 to renew its charging cycle with each input pulse. Thus the blocking oscillator is not triggered and the multivibrator 10 is not returned to its initial stable state until a fixed time interval following the last of the series of input pulses.

Figure 2:
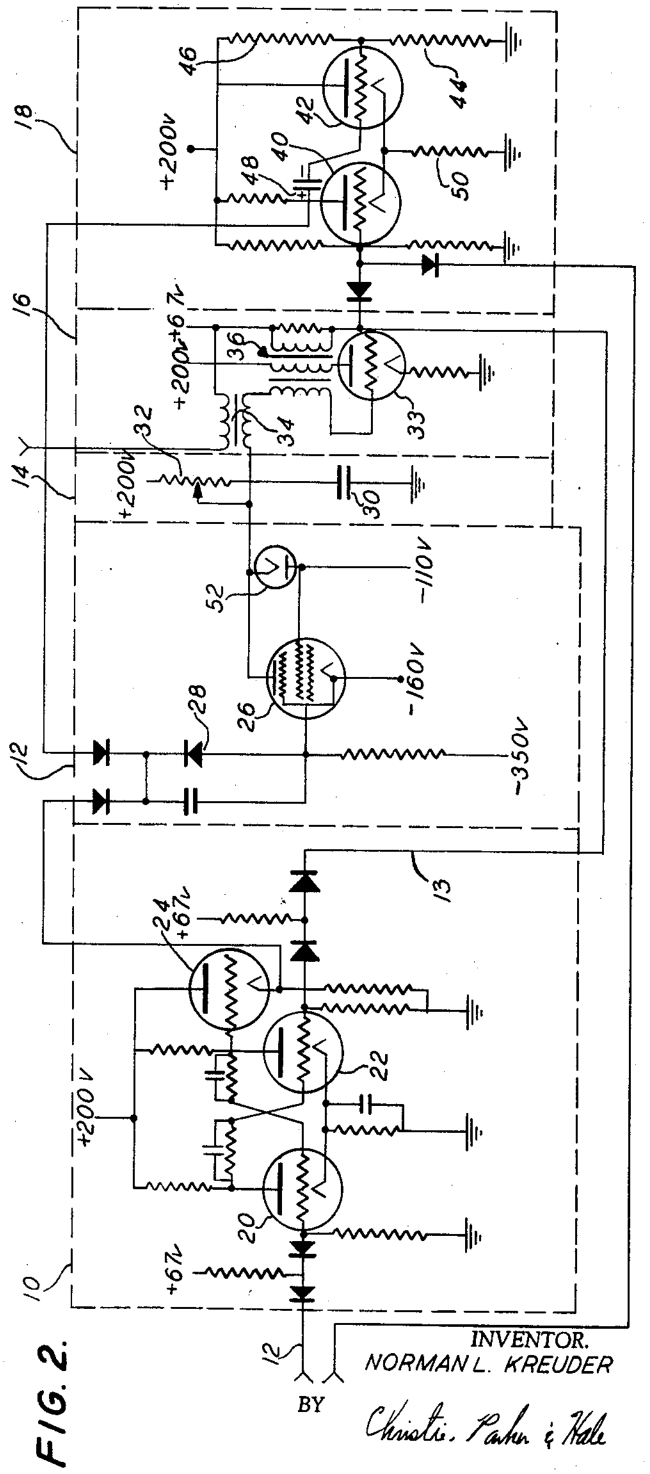
Fig. 2 is a schematic wiring diagram of the extended delay circuit.

Referring to the schematic showing of Fig. 2, the circuits corresponding to the blocks of Fig. 1 are enclosed in dash lines and similarly numbered. It will be seen that the bistable multivibrator circuit 10 is of conventional design, negative input pulses being applied to the grid of one of two triode tubes 20 and 22. The output voltage level is derived through a cathode follower stage 24 coupled to the plate of the tube 22 of the multivibrator 10. Following the initial input pulse from the input lead 12, the tube 20 is cut off and the tube 22 is conductive. Thus the output level derived from the cathode follower stage 24 is reduced from a relatively high level to a relatively low level with the initial input pulse.

The cathode of the cathode follower 24 is coupled to the control grid of a switching tube 26 in the switch circuit 12. Proper bias is maintained on the control grid of the tube 26 by a voltage divider including a Zener diode 28 or other voltage regulating device which maintains a substantially fixed voltage drop thereacross. Thus when the cathode of the cathode follower 24 is lowered in potential following the initial input pulse, the tube 26 is biased below cutoff.

The charging circuit 14 includes a storage capacitor 30 connected to a positive voltage source through a charging resistor 32 which forms the plate load of the switching tube 26. With the switching tube 26 cut off, the storage capacitor 30 begins to charge up through the resistor 32 from the positive potential source. Charging time is determined by the time constant of the RC circuit formed by the capacitor 30 and resistor 32 in series.

The storage capacitor 30 is connected to the grid of a conventional blocking oscillator circuit 16 through a sync transformer 34 and the blocking oscillator feedback transformer 36. The sync transformer 34 is not essential to the present invention but it may be provided for introducing a clock pulse to trigger the blocking oscillator 16 from some external circuit if desired.

When the storage capacitor 30 charges to a predetermined potential, the control grid of the tube 33 of the blocking oscillator 16 is biased above cutoff and the blocking oscillator "fires." The resulting pulse is coupled out by the transformer 36, fed back through the lead 13 to the bistable multivibrator 10, and applied to the control grid of the tube 22, driving this tube to cutoff and restoring the tube 20 to its conductive condition. Thus the bistable multivibrator is returned to its initial condition a predetermined time interval after the initial pulse is applied to the input 12.

The negative pulse generated by the blocking oscillator circuit 16 is also coupled to the input of the conventional monostable multivibrator circuit 18 which includes a pair of tubes 40 and 42. The negative pulse from the blocking oscillator circuit 16 cuts off the tube 40. The tube 42 is normally held below cutoff by a voltage divider formed by a pair of resistors 44 and 46. Thus a capacitor 48 is charged up to some predetermined value depending upon the potential difference of the plate of the tube 40 and the grid of the tube 42. When a negative pulse is received from the blocking oscillator 16, the tube 40 is momentarily cut off and its plate potential rises. This raises the potential of the grid of the tube 42 causing it to conduct. It continues to conduct until the charge in the condenser 48 is sufficiently discharged, at which time the control grid of the tube 42 drops below cutoff reducing the current through the common grid resistor 50, permitting the cathode of the tube 40 to drop to a point where it again becomes conductive.

The sudden rise in the plate voltage of the tube 40 when the multivibrator circuit 18 is triggered is used to bias on the switching tube 26. This provides a low impedance shunt across the storage capacitor 30 discharging it to a predetermined level determined by a clamping diode 52. The clamping diode is connected to a fixed negative potential and thus provides a standardized starting point for the charging of the storage capacitor 30.

Input pulses are also applied to the monostable multivibrator circuit 18, and thus following each input pulse in a series, the storage capacitor 30 is discharged back to its starting point and caused to start its charging cycle once more. As long as input pulses are applied to the circuit at intervals less than the time required for the storage capacitor 30 to rise to a potential where the blocking oscillator 16 is triggered, the bistable multivibrator 10 will not be restored to its initial condition. Following the last of the input pulses, however, the storage capacitor 30 becomes charged to the level where the blocking oscillator 16 is triggered, causing the bistable multivibrator 10 to return to its initial stable condition.

It should be noted that the function of the monostable multivibrator is to extend the time the switch 12 is biased conductive sufficiently to discharge the storage capacitor 30. If the time constant is made very short and the duration of the input pulses and the pulse derived from the blocking oscillator is sufficiently long it may be possible to dispense with the monostable multivibrator without otherwise affecting circuit operation.

From the above description it will be recognized that a circuit is provided in which a multivibrator is not returned to its initial condition until a predetermined time interval following a series of input clock pulses. Thus the present invention provides a circuit which duplicates the action of a resettable monostable multivibrator, but the present circuit may be made more accurate and foolproof. The generated time delay is independent of the number of input pulses which reset the circuit, the time delay being identical whether one input pulse is applied or a hundred input pulses are applied.

It should be noted that the input pulses to the bistable multivibrator 10 and to the monostable multivibrator 18 may be derived from a common source if so desired without materially affecting the operation of the circuit. The fact that they can be separate, however, adds additional flexibility to the circuit.

What is claimed is:

1. An extended delay circuit for producing a delayed output pulse following the termination of train of input pulses comprising a bistable multivibrator, a switching tube biased on and off by the bistable multivibrator, a storage capacitor connected to the switching tube and to a charging source of potential, whereby the capacitor is charged when the switching tube is biased off and discharged when the switching tube is biased on, the charging rate of the capacitor being slow compared to the interval between the input pulses, a blocking oscillator coupled to the storage capacitor and adapted to be triggered when the storage capacitor is charged to a predetermined potential level, the output of the blocking oscillator being coupled to one side of the bistable multivibrator for triggering the bistable multivibrator to the condition in which the switching tube is biased on, whereby the storage capacitor is discharged, and a monostable multivibrator coupled to the output of the blocking oscillator, said train of input pulses being applied to the monostable multivibrator for triggering on the monostable multivibrator, the output of the monostable multivibrator being coupled to the input of the switching tube for biasing on the switching tube during the on time of the monostable multivibrator, whereby the storage capacitor is repeatedly discharged by each of the input pulses applied to the monostable multivibrator at intervals less than the charging time of the storage capacitor required to actuate the blocking oscillator, the delayed output pulse being derived from the blocking oscillator.

2. An extended delay circuit for producing a delayed output pulse following the termination of train of input pulses comprising bistable means having two stable states, a storage capacitor connected to a charging source of potential, the charging rate of the capacitor being slow compared to the interval between the input pulses, switching means for discharging the storage capacitor, the switching means being responsive to the bistable means, whereby the storage capacitor is charged and discharged in response to the state of the bistable means, a blocking oscillator coupled to the storage capacitor and adapted to be triggered when the storage capacitor is charged to a predetermined potential level, the output of the blocking oscillator being coupled to one side of the bistable means for triggering the bistable means to the state in which the storage capacitor is discharged, and a monostable multivibrator coupled to the output of the blocking oscillator, said train of input pulses being applied to the monostable multivibrator for triggering on the monostable multivibrator, the output of the monostable multivibrator being coupled to the switching means for discharging the storage capacitor during the on time of the monostable multivibrator, whereby the storage capacitor is repeatedly discharged by each of the input pulses applied to the monostable multivibrator at intervals less than the charging time of the storage capacitor required to actuate the blocking oscillator, the delayed output pulse being derived from the blocking oscillator.

3. An extended delay circuit for producing a delayed output pulse following the termination of train of input pulses comprising a storage capacitor connected to a charging source of potential, the charging rate of the capacitor being slow compared to the interval between the input pulses, switching means for discharging the storage capacitor, a blocking oscillator coupled to the storage capacitor and adapted to be triggered when the storage capacitor is charged to a predetermined potential level, and a monostable multivibrator coupled to the output of the blocking oscillator, said train of input pulses being applied to the monostable multivibrator for triggering on the monostable multivibrator, the output of the monostable multivibrator being coupled to the switching means for discharging the storage capacitor during the on time of the monostable multivibrator, whereby the storage capacitor is repeatedly discharged by each of the input pulses applied to the monostable multivibrator at intervals less than the charging time of the storage capacitor required to actuate the blocking oscillator, the delayed output pulse being derived from the blocking oscillator.

4. An extended delay circuit for producing a delayed output pulse following the termination of train of input pulses comprising a storage capacitor connected to a charging source of potential, the charging rate of the capacitor being slow compared to the interval between the input pulses, switching means for discharging the storage capacitor, trigger means coupled to the storage capacitor and adapted to be triggered when the storage capacitor is charged to a predetermined potential level, and a monostable multivibrator coupled to the output of the trigger means, said train of input pulses being applied to the monostable multivibrator for triggering on the monostable multivibrator, the output of the monostable multivibrator being coupled to the switching means for discharging the storage capacitor during the on time of the monostable multivibrator, whereby the storage capacitor is repeatedly discharged by each of the input pulses applied to the monostable multivibrator at intervals less than the charging time of the storage capacitor required to actuate the trigger means, the delayed output pulse being derived from the trigger means.

5. An extended delay circuit for producing a delayed output pulse following the termination of a train of input pulses, comprising a storage capacitor connected to a charging source of potential, the charging rate of the capacitor being slow compared to the interval between the input pulses, switching means for discharging the storage capacitor, trigger means coupled to the storage capacitor and adapted to be triggered when the storage capacitor is charged to a predetermined potential level, and means for actuating the switching means to discharge the storage capacitor in response to an applied pulse, said train of input pulses and the output of the trigger means being applied to said last-named means, whereby the storage capacitor is repeatedly discharged by each of the input pulses received at intervals less than the charging time required by the storage capacitor to actuate the trigger means, the delayed output pulse being derived from the trigger means.

References Cited in the file of this patent

UNITED STATES PATENTS

| | | |
|---|---|---|
| 2,444,036 | Crost | June 29, 1948 |
| 2,524,710 | Miller | Oct. 3, 1950 |
| 2,661,421 | Talamini et al. | Dec. 1, 1953 |
| 2,727,144 | Leyde et al. | Dec. 13, 1955 |
| 2,759,998 | Labin et al. | Aug. 21, 1956 |
| 2,784,910 | Ghiorso et al. | Mar. 12, 1957 |

FOREIGN PATENTS

| | | |
|---|---|---|
| 530,789 | Canada | Sept. 25, 1956 |